United States Patent [19]

Davies et al.

[11] Patent Number: 5,338,573
[45] Date of Patent: Aug. 16, 1994

[54] COMPOUND FOR COVERING A SUBSTRATE

[76] Inventors: Derek Davies, Clifton Hall, Clifton, Ashbourne, Derbyshire DE6 2GL/GB, Great Britain; Kenneth Hughes, 25 Portland Drive, Nuneaton, Warwickshire CV10 9HZ/GB, Great Britain

[21] Appl. No.: 838,437
[22] PCT Filed: Jan. 25, 1991
[86] PCT No.: PCT/GB91/00106
  § 371 Date: Mar. 6, 1992
  § 102(e) Date: Mar. 6, 1992
[87] PCT Pub. No.: WO91/12218
  PCT Pub. Date: Aug. 22, 1991

[30] Foreign Application Priority Data

Feb. 9, 1990 [GB] United Kingdom ............ 9002942
Nov. 19, 1990 [GB] United Kingdom ............ 9025064

[51] Int. Cl.$^5$ .......................... B05D 1/00; C04B 14/02
[52] U.S. Cl. ............................. 427/331; 427/372.2; 427/359; 427/397.7; 427/428; 106/683; 106/688; 106/691; 106/692; 106/713; 106/737; 106/738; 106/788; 106/816; 106/817
[58] Field of Search ............ 106/716, 788, 721, 737, 106/738, 683, 684, 688, 691, 692, 694, 705, 709, 713, 817, 816; 427/372.2, 397.7, 428, 359, 331

[56] References Cited

U.S. PATENT DOCUMENTS

| | | | |
|---|---|---|---|
| 2,274,705 | 3/1942 | Karrick | 106/784 |
| 4,202,851 | 5/1980 | Kroyer | 264/113 |
| 4,398,960 | 8/1983 | Murray | 106/816 |
| 4,515,861 | 5/1985 | Arup | 106/737 |
| 4,588,443 | 5/1986 | Bache | 106/737 |
| 4,731,120 | 3/1988 | Tuutti | 106/DIG. 1 |
| 4,732,782 | 3/1988 | Babcock | 427/427 |
| 4,747,878 | 5/1988 | Babcock | 405/222 |

FOREIGN PATENT DOCUMENTS

| | | |
|---|---|---|
| 0066099 | 8/1982 | European Pat. Off. . |
| 0157749 | 10/1985 | European Pat. Off. . |
| 524434 | 9/1921 | France . |
| 532366 | 2/1922 | France . |
| 1051569 | 1/1954 | France . |
| 1460348 | 12/1964 | France . |
| 2354866 | 1/1978 | France . |
| 59-227762 | 12/1984 | Japan .................... 106/816 |
| WO 87/05833 | 10/1987 | PCT Int'l Appl. . |
| WO 88/06083 | 8/1988 | PCT Int'l Appl. . |
| 25992 | 11/1913 | United Kingdom . |
| 2030507 | 4/1980 | United Kingdom . |

OTHER PUBLICATIONS

McGraw-Hill Dictionary of Scientific and Technical Terms, (3rd Edition) p. 37 (1984).
Askeland, Donald R., "The Science and Engineering of Materials" p. 543 (1984).
The Random House Dictionary of the English language, (1973).
Construction Dictionary, Greater Phoenix, Ariz. Chapter #98, The National Association of Waner In Construction, pp. 12–13, (1989).

*Primary Examiner*—Anthony Green
*Attorney, Agent, or Firm*—Jones & Askew

[57] ABSTRACT

A process for producing a hard material from a cementitious mixture, the process including the steps of blending together a cement constituent and a filler constituent whilst in a dry condition to provide a compactable homogeneous mixture containing a predetermined volume of voids defined between filler particles up to a predetermined size, laying the dry mixture onto a substrate, sparingly applying water to the surface of the mixture to dampen the surface layer of the mixture for causing setting of the cement in said surface layer and subsequently applying more water for causing setting and hardening of the remainder of the cement.

22 Claims, 5 Drawing Sheets

COMPOUND FOR COVERING A SUBSTRATE

The present invention relates to a process for producing a concrete type hard material from a cementitious mixture, to a cementitious mixture for creating said hard material, and to a hard material produced by the process.

In this specification concrete type hard material means a hard material having compressive and flexural strengths comparable to that of conventional concrete and thereby enabling the material to be used as a load bearing self supporting hard material.

Known hard materials produced from cementitious mixtures generally fall into two categories, viz mortar or concrete. Mixtures for producing mortars and concretes include a cement, usually either a hydraulic or non-hydraulic cement, and a filler. Additional components may be present in concretes or mortars, for example pozzolanic materials, accelerators, colouring agents, fibres etc. The fillers are generally referred to as aggregates and are divided into fine and coarse categories. The division between fine and coarse aggregates is generally regarded in the United Kingdom as occurring at a sieve size of 5 mm; ie aggregates above a sieve size of 5 mm are coarse aggregates and aggregates below a sieve size of 5 mm are fine aggregates and are often referred to as sand.

Concrete contains coarse aggregate usually in excess of 50% by weight and up to 20 mm in size whereas mortars do not contain coarse aggregate but fine aggregate and the maximum particle size of the fine aggregate or sand is generally less than 1.2 mm.

In use, mortars are distinct from concretes in that mortars do not have the requisite compressive and flexural strengths or dimensional stability to be load bearing and self supporting.

Conventionally, the constituents for producing concretes and mortars are normally mixed together with water before placing. Generally, the water addition is greatly in excess of that required for the hydration of cement, the surplus water being required to provide sufficient fluidity to the wet mixture to enable it to be laid and enable adequate compaction to take place.

The excess water required for compaction and ease of placing is otherwise detrimental to all the qualities of the final product including strength and durability and, frequently, leads directly to failure and loss of integrity due to self induced cracking arising from drying shrinkage.

Long reign durability or dimensional stability is important for concrete in order to maintain its load bearing capabilities. Accordingly, it is common to incorporate coarse aggregate into the mixture in order to reduce surface area within the mixture and thereby enable the mixture to be relatively fluid with the introduction of less water.

Accordingly for concrete, there is a need for larger aggregate sizes to be used to reduce the surface area and water demand so as to control shrinkage. However, the use of coarse aggregate sizes necessitate far thicker sections of material being placed than would otherwise be required. In addition with a wet mixed concrete, use of thin sections is also undesirable since this encourages rapid drying which induces cracking. Accordingly, laying wet mixed concrete in relatively thick sections is desirable to prevent cracking due to drying.

The problems of excess water addition are made worse when proper equipment for thorough mechanical mixing of the materials and for subsequent compaction are not available, as is frequently the case.

The work and cost involved in handling, mixing and placing the materials is greatly increased by the need for separate on-site mixing and for adequate compaction.

The need for formwork to contain the fluid concrete and resist the vibration or tamping which is necessary to achieve compaction further increases the difficulties in use.

It is a general aim of the present invention to provide an improved cementitious mixture and process for forming a concrete type hard material (of similar or better performance characteristics than concrete) which obviates the need to mix the constituents with water prior to laying and which produces a hard, strong, durable material with low shrinkage which is capable of being laid in relatively thin sections and yet be load bearing and self supporting.

In achieving this aim, the present invention provides a cementitious mixture which, not only avoids the need for mixing with water prior to laying but, can also easily and conveniently be placed, formed and provide a compacted product without the need for special equipment.

It is also the intention that the process shall be both simple and reliable in use and be capable of being effectively employed in most situations.

A further objective is to be able to effectively employ a thinner section of material so as to minimise the material required and thus to further reduce the work involved in use. In achieving this, the shrinkage is minimised and the tensile and flexural strengths of a thin section are improved when compared to conventional wet mixed concretes.

According to one aspect of the present invention there is provided a process for producing a hard material from a cementitious mixture, the process including the steps of blending together a cement constituent and a filler constituent whilst in a dry condition to provide a compactable homogeneous mixture as defined hereinafter, laying the dry mixture onto a substrate, sparingly applying water to the surface of the mixture to dampen the surface layer of the mixture for causing setting of the cement in said surface layer and subsequently applying more water for causing setting and hardening of the remainder of the cement.

In this specification, the term 'cement constituent' includes all reactive materials in the mixture which react together to form a cementitious medium in which inert filler particles are embedded.

Preferably the amount of water which is sparingly applied is sufficient to dampen most of the mixture.

Preferably after sparingly applying water and prior to application of more water a compacting step is performed on the surface layer to smooth and compact at least the surface layer.

It is envisaged that the water may be sparingly applied by spraying and this may cause local disturbance of the surface. The compaction step will thereby smooth out this disturbance and the compaction will produce a relatively dense material at least at the surface layer. In this condition, the surface layer is more resistant to the application of additional water without disturbance.

The compaction is conveniently achieved by applying a compressive force using a roller and the surface and underlying dry mixture, particularly if damp, is readily compacted in this way so that, for example, it will immediately withstand being walked upon without taking an impression. Conveniently, the roller may be a light weight hand held roller.

Where very high levels of strength, dimensional stability and durability are required, heavier rollers and other means of compaction, eg vibrators, can be employed to provide greater consolidation and reduction of voids.

The amount of water initially added is sufficient only to enable this compaction and consolidation to be achieved and generally represents approximately 10% to 30%, more preferably 10% to 20% of the weight of hydraulic cement within the dry mixture. This amount of water is not very critical provided that saturation is avoided and that sufficient water is applied to dampen and compact the mixture and to initiate the hydration process at the surface layer of the mixture.

After initial laying and spreading, the particles of the constituents reside in intimate contact and the water initially applied tends to surround the particles rather than immerse them and due to surface tension in meniscuses formed between these particles, the particles tend to be drawn together and give stability to the dampened mixture.

Saturating the material at this stage with water is to be avoided as this would lead to the separation of the solid particles by a film of water and result in swelling and subsequently, lead to drying shrinkage as experienced with wet mixed materials when the surplus water is removed.

Also, adding more water at this stage, could lead to an excessive amount of the fine cementitious constituent being washed from the surface. Additional water, which will eventually be necessary for the continuation of the hydration process is preferably added after the hydration of the cement has commenced and the initial set has occurred. The application of this additional water will not, then, adversely effect the surface of the material and the water will also then be more readily absorbed without the risk of separating the cementitious materials.

This additional water requirement will, generally, be about 10% to 30%, more preferably about 20% to 30% of the cement weight to give a water/cement ratio of about 40% which provides the surplus water necessary to achieve full hydration with ordinary Portland type cements.

At this stage the risk of excessive water addition is slight as when sufficient water has been added absorption will stop.

According to another aspect of the invention there is provided a dry lay homogeneous cementitious mixture comprising a cement constituent and a filler constituent for producing a hard cementitious material, the relative proportions and grading of the constituents being such that (i) the bulk compacted volume of finer particles exceeds the volume of voids between compacted coarser particles as determined in the absence of the finer particles such that coarser particles are suspended in and spaced part by the finer particles so as to avoid segregation of the mixture (ii) the ratio $R_{vc}$ is 3 or less, and (iii) the ratio $R_{sv}$ is 2 or more, wherein $R_{vc}$ is the ratio of total volume of voids in the mixture when compacted to the absolute volume of the cement constituent, and $R_{sv}$ is the ratio of total absolute volume of all constituents to total volume of voids in the dry mixture when compacted.

Preferably the $R_{vc}$ volume is about 2.5 or less, more preferably about 2 or less to provide a hard material which is self supporting and load bearing when laid in thin sections.

The absolute volume of the dry mixture is determined by measuring the mass of a known volume of dry mixture when fully compacted and then calculating the absolute volume using the known grain densities of the constituents and measured mass.

Compacted volumes are measured by placing the constituents in a container and compacting the surface of the mixture until a minimum volume is achieved. This minimum volume constitutes a compacted volume within the meaning of this specification.

BRIEF DESCRIPTION OF THE DRAWINGS

Various aspects of the present invention are hereinafter described below with reference to the accompanying drawings in which.

Figure 1:
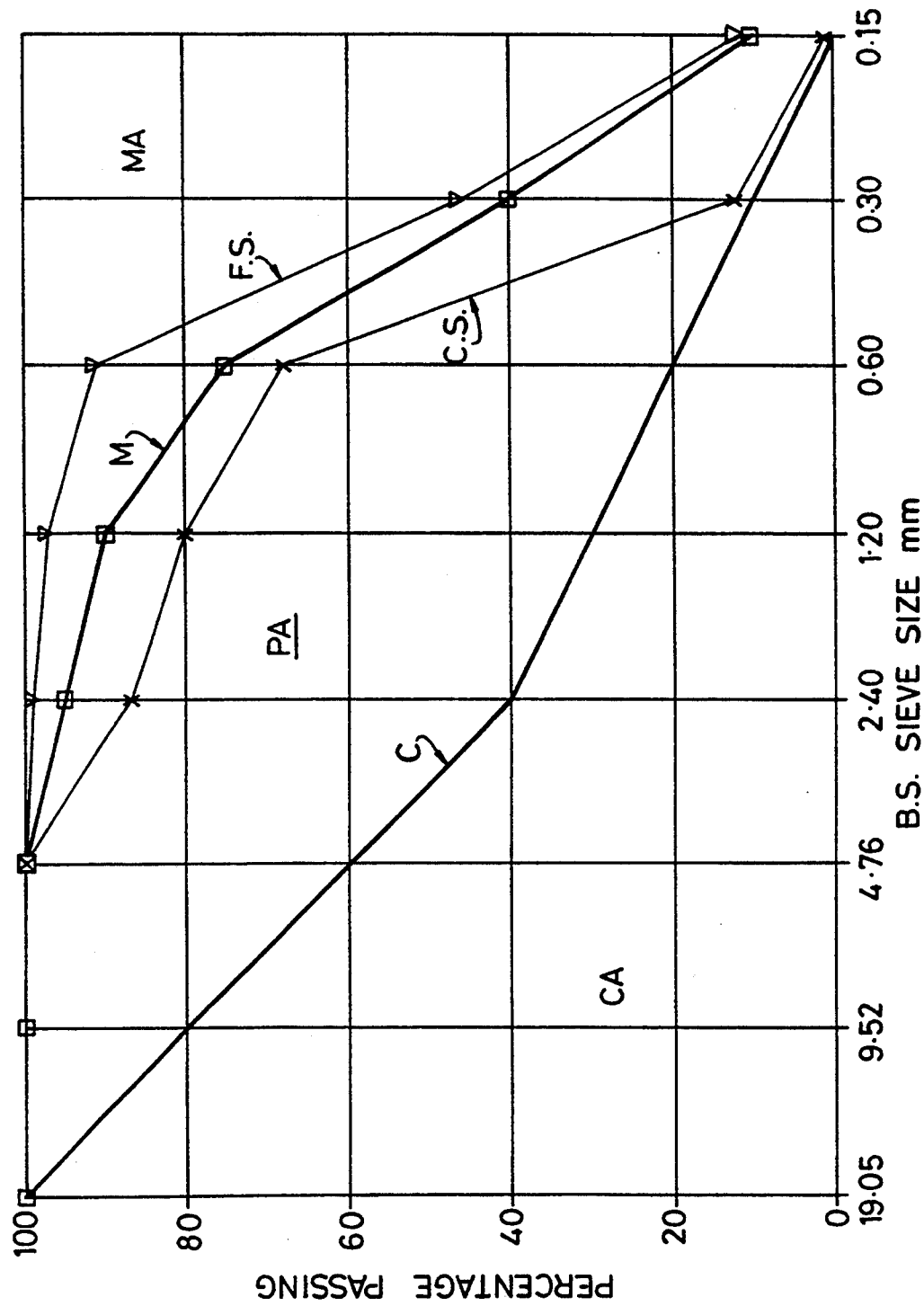
FIG. 1 is a graph showing grading of filler for use in a mixture according to the present invention.

As indicated above in order to enable a dry mixture to be transported and laid in a dry condition to provide a hard cementitious material it is necessary for the mixture to resist segregation prior to application of water and also for the mixture to contain the necessary grading and proportions of cement and filler to provide the necessary strength and dimensional stability for the hard material. These requirements are discussed in greater detail below.

Segregation

During the laying process the mixture is inevitably poured and spread and it is important, in order to maintain the homogeneity of the mixture, that the constituents, in particular coarse filler particles, do not segregate.

In a dry mixture segregation between finer and coarser particles occurs when the coarser particles are present in such numbers that they touch and create interstices. On disturbance of such a mixture eg. vibration or spreading of the mixture, the finer particles fall under gravity through the interstices. There is thus a migration of finer particles to the bottom of the mixture and a migration of coarser particles to the top of the mixture. It is not possible to remedy this segregation by compaction since the bed of fine particles, once formed, will not permit penetration of the coarser particles.

Accordingly, in the mixture of the present invention the cement or cement plus finer filler particles at any separation will always exceed the volume of voids which exist between the coarser particles and which are capable of being filled by the cement or cement plus finer filler particles. (Not all voids are capable of being filled as some will be as small as the voids between the finer particles).

In effect this will mean that the addition of cement or cement plus finer particles to the coarser particles will always result in an increase in bulk volume of the mixture.

The degree by which the cement or cement plus finer filler particles must exceed the volume of voids between the coarser particles depends on the size difference and the coarser the particles the greater the degree of separation required to prevent segregation and the greater the surplus of fines over voids which is required. In this way the coarser particles do not form interstices by touching and so migration of finer particles to the bottom of the mixture is avoided.

Generally the finest particles in the mixture are formed by the cement particles which are typically about 0.02 mm in size. Thus, in the main, the filler particles may be considered to be suspended in and spaced apart by the finer cement particles. Thus after hydration a continuous cement hydrate phase is formed in which the filler particles are embedded.

In summary, therefore, in order to avoid segregation in accordance with the present invention, the bulk volume of fine particles (i.e. cement or cement plus fine filler) will, when compacted, always exceed the voluble of voids between the compacted coarser particles (these voids being capable of being filled by the finer particles) such that the coarser particles are suspended and separated by the finer particles and the combined bulk volume of the compacted mixture is greater than the bulk volume of the compacted coarse material.

Relationship between the $R_{vc}$ and $R_{sv}$ ratios

As the $R_{vc}$ ratio decreases the strength of the hard material increases due to the increase in cement content. However, increase in cement content increases the probability of long term cracking and so adequate filler needs to be present to provide desired long term dimensional stability. An increase in the $R_{sv}$ ratio provides greater long term dimensional stability but provides a decrease in strength of the hard material. Thus for a given grading of filler a cement/filler mixture ratio by weight has to be chosen which provides $R_{vc}$ and $R_{sv}$ ratios within defined limits.

As indicated above, to prevent segregation a continuous system of fine cementitious material is established to fill all interstices and provide a bed in which the larger aggregate materials are separated and suspended. This means that a relatively large cement constituent is present.

It would be expected therefore that in such a system the cement hydrate would play a predominant role, as this forms a continuous system, and the aggregate will have comparatively little effect, acting largely as an inert filler. Tests have been undertaken with various mixtures of cement and two different fine aggregates, one being a fine sand and the other being a coarse sand. Both of these mixtures resist segregation in accordance with the present invention.

The grading of these fine and coarse sands is shown in FIG. 1 wherein the grading of the fine sand is represented by line FS and the grading of the coarse sand is represented by the line CS.

Cubes for compressive testing were produced by carefully and thoroughly compacting mixtures of cement and these sands into 1 litre moulds. Compaction was achieved by using a 20 mm square rod to progressively compact the dry material in layers until solid, and no further compaction could be achieved.

This was done for ratios of cement to filler from 1 to 1 up to 1 to 5 by weight.

The dry weight of each cube was accurately determined and based on the grain densities of the component materials the voids remaining after compaction was calculated.

The moulds and compacted dry materials were then briefly immersed in water and, after removal, the disturbed top face was made good by trowelling. After 2 hours, when the top surface had set, the moulds were again immersed in water for 24 hours.

Figure 2:
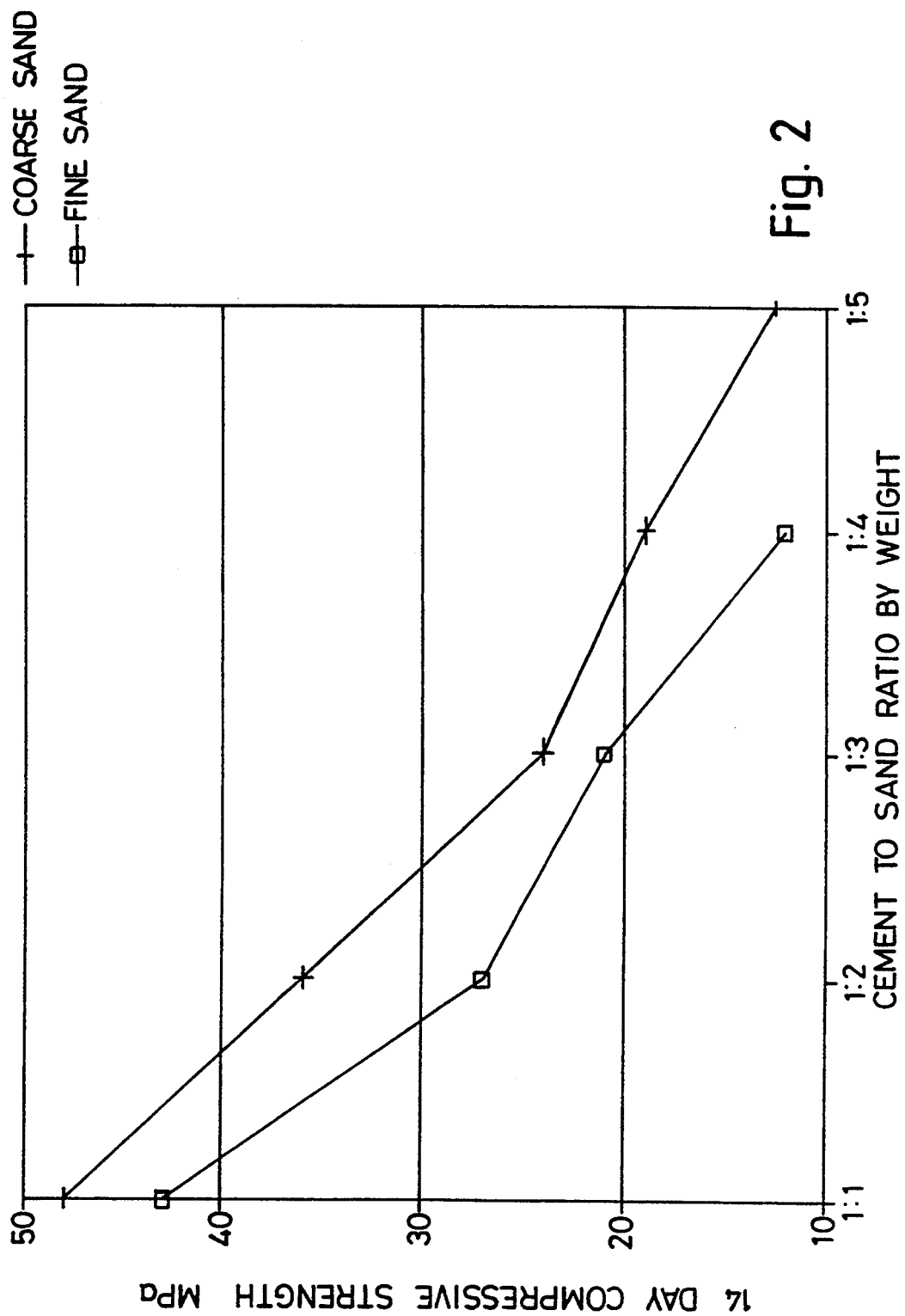
FIG. 2 is a graph showing a plot of compressive strength v cement/filler ratios for hard materials produced from mixtures according to the present invention.

The cubes were then demoulded and immersed in water for 13 days. They were then subjected to a compressive strength test. The compressive strengths of the cubes produced for both fine and coarse sands are shown graphically in FIG. 2.

It can be seen that the strength increases progressively with increased cement content.

It is evident that the cement hydrate is providing virtually all the strength, the aggregate simply acting as a filler and diluting the strength in proportion to the amount added; this is to be expected from a continuous cement hydrate.

There is an expected difference between the strengths achieved with the fine and the coarse sand with the coarser materials giving a consistently higher strength.

Figure 3:
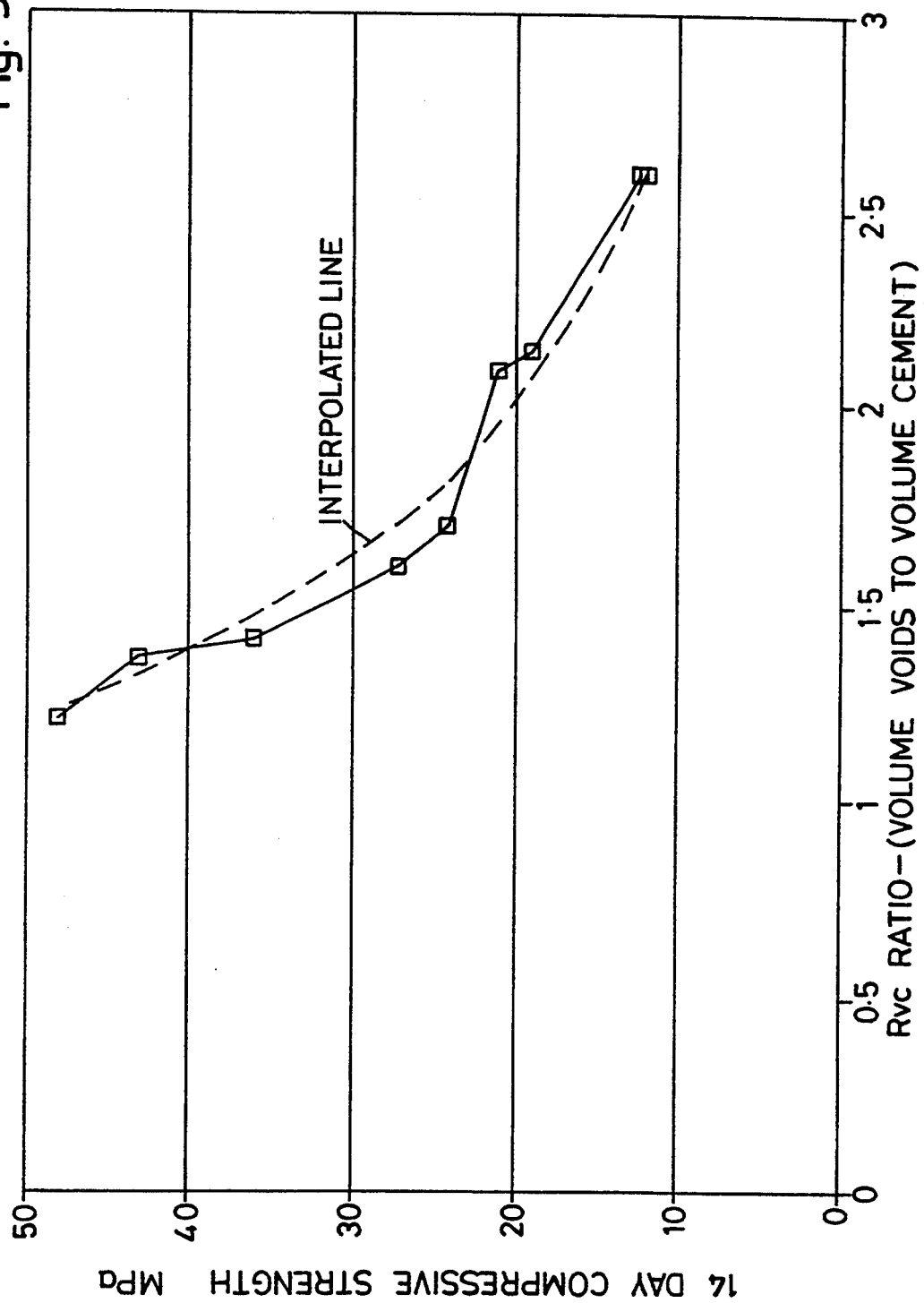
FIG. 3 is a graph showing a plot of compressive strength v $R_{vc}$ ratio for a hard material produced from a mixture according to the present invention.

If the $R_{vc}$ is calculated and plotted against the compressive strength, then the difference between the sands is virtually eliminated. A graph showing this plot is shown in FIG. 3. By producing such a graph it is possible to determine for a given grading of filler a $R_{vc}$ ratio for providing a desired compressive strength.

It is evident, therefore, that for strength the $R_{vc}$ ratio is an important criteria. An $R_{vc}$ ratio much greater than 2.0 would produce a material with strength and durability which would be unacceptable for most surfacing purposes, particularly thin sections.

Dimensional Stability

As indicated above, to achieve the requirement of segregation prevention and adequate strength a cement content higher than for conventional concrete is required. If such a material were to be conventionally wet mixed or become so saturated with water that the fine cement component swelled, then the initial drying shrinkage would result in a material prone to cracking and, therefore, unsuitable for surfacing.

By limiting the water addition, the initial drying shrinkage is prevented and tests have shown that plastic cracking cannot be induced, even with severe drying. However, long term shrinkage does take place and to control this an adequate volume of stable aggregate must be incorporated and equally important the voids must be limited. In this respect it will be appreciated that shrinkage can only occur when voids exist which are not filled with a cement hydrate.

To provide a material with a sufficiently low overall shrinkage it is necessary to limit the voids in relation to the total solids content. In order to establish suitable mixtures for volumetric stability the ratio $R_{sv}$ is used.

Selection of $R_{vc}$ and $R_{sv}$ ratios

For a given dry compacted mixture of cement and fine aggregate, which will not segregate, it is necessary for the two conflicting ratios of $R_{vc}$ and $R_{sv}$ to be optimised bearing in mind the end use of the hard material. For a thin layered hard material the $R_{vc}$ value is preferably 2 or less and the $R_{sv}$ ratio is preferably 2 or more. For other applications an $R_{vc}$ ratio up to about 2.5 would be acceptable.

Figure 4:
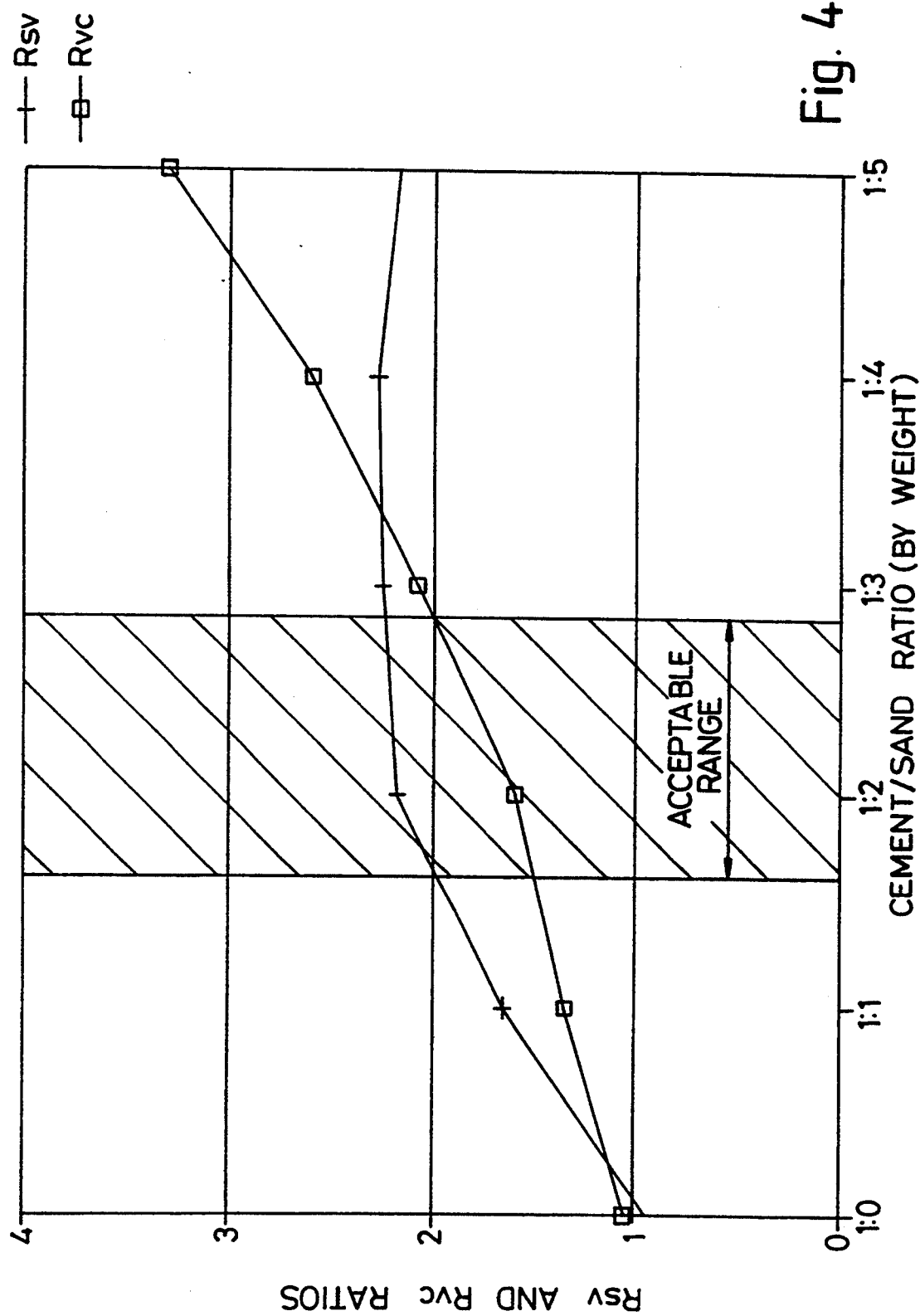
FIG. 4 is a graph showing plots of $R_{vc}$ and $R_{sv}$ ratios v cement/filler ratio by weight for a fine sand.
Figure 5:
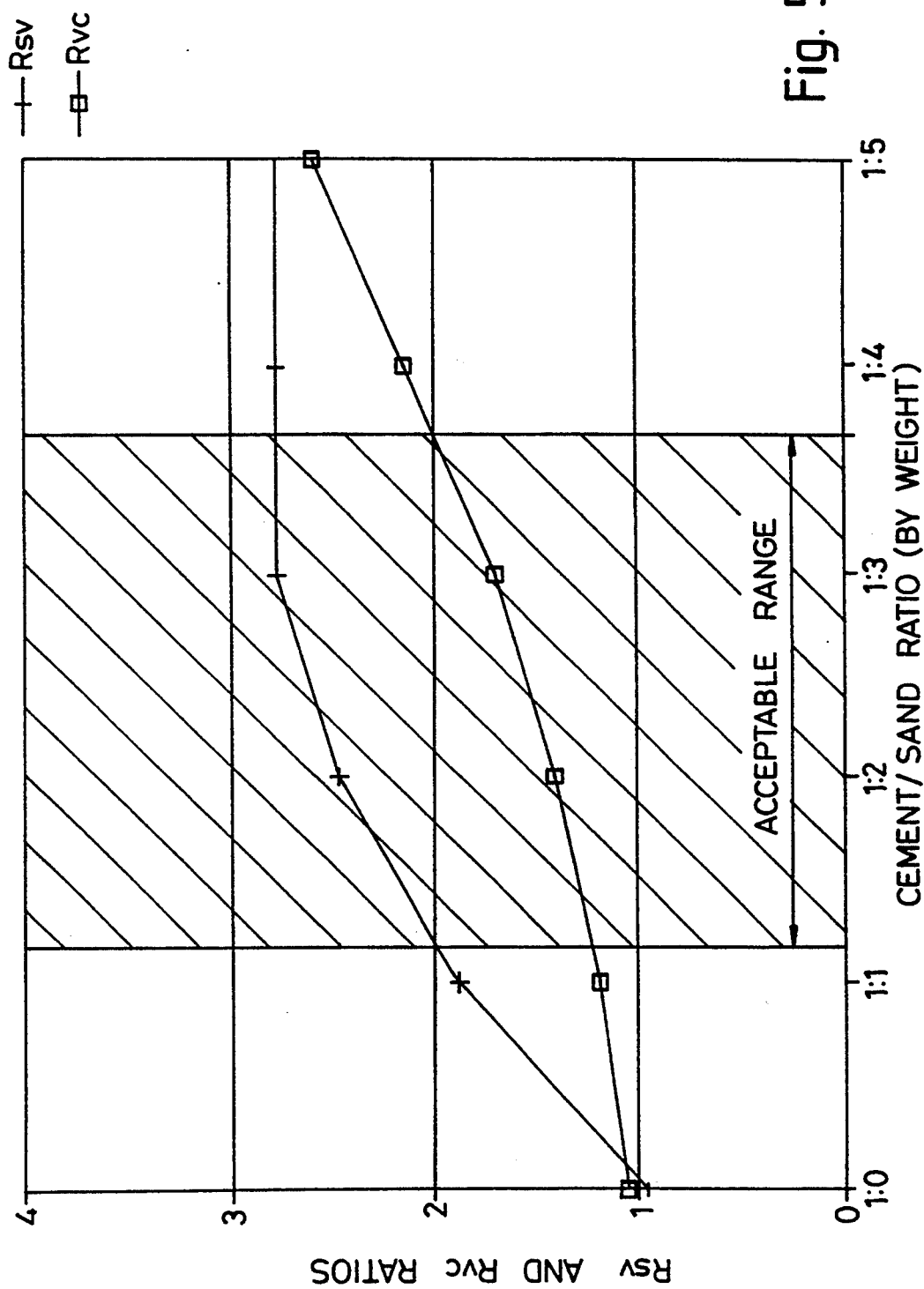
FIG. 5 is a graph showing plots of $R_{vc}$ and $R_{sv}$ ratios v cement/filler ratio by weight for a coarse sand.

In FIG. 4 there is shown a graph showing plots of $R_{vc}$ and $R_{sv}$ against cement/filler ratios by weight for the fine sand (FS) of FIG. 1 and a similar graph is shown in FIG. 5 in respect of the coarse sand (CS).

It can be seen from FIG. 4 that for the fine sand there is only a narrow band in which the $R_{vc}$ is below 2 and $R_{sv}$ is above 2.

In the case of the coarse sand (CS), it will be seen from FIG. 5 that there is a much wider band where the two ratios are acceptable and this material will give better and a more reliable performance.

Thus by selecting a cement/filler ratio within the range determined by the $R_{vc}$ and $R_{sv}$ limits it is possible to achieve different desired compressive strength or dimensional stability characteristics.

In addition to the need to reduce the overall shrinkage of the material it is also necessary to ensure that the reversible moisture movements and coefficient of thermal expansion are at an acceptably low level by incorporating sufficient stable filler and this will generally require a cement/sand ratio of at least 1 to 2. Preferably the cement/sand ratio is chosen to be between 1:2 to 1:3 in order to provide optimum performance, the higher filler content giving greater overall stability.

Grading of filler

Generally, when formulating the grading of the filler constituent, the range of sieve sizes/percentage passing of the filler are preferably chosen from the area PA defined between plots C and M in FIG. 1. Plot C represents a boundary of ranges for obtaining a suitable concrete filler and plot M represents a boundary of ranges for obtaining a suitable mortar filler.

Thus a filler for a concrete is normally formulated from a selection of sizes/percentage passing from the area CA defined by plot C and a filler for a mortar is normally formulated from a selection of sizes/percentage passing from the area MA defined by plot M.

Generally the major volume of the filler for use in the present invention will be composed of particles up to a sieve size of about 1.2 mm, more preferably about 1.0 mm.

A suitable filler is sand, naturally formed or formed from crushed rock, and having a range of particle sizes from minus 150 microns up to about 3 mm wherein about 5% by volume of the sand has a particle size less than about 0.2 mm and about 70% by volume of the sand has a particle size less than about 0.6 mm. Other formulations from the area PA or MA shown in FIG. 1 may be chosen. For example, the volume of sand having a particle size less than about 0.2 mm may be increased to about 8% and preferably at least 40% by volume has a particle size less than 0.6 mm. However, as demonstrated by the graph of FIGS. 4 and 5 a grading of fine sand chosen from the area MA provides a narrower range of cement/filler ratios than a grading chosen from the PA area.

As indicated previously, the maximum volume and size of the larger particles in the graded filler constituent is limited by the $R_{sv}$ ratio and also the requirement for resisting segregation. In addition, when the dry mixture is intended for laying in thin sections the largest particles should be of a size which is less than about half of the intended thickness of the thin section so as to avoid the larger particles contacting one another and protruding above the surface. In practice it is envisaged that the maximum size of filler particle in the graded filler constituent will be about 10 mm. To incorporate larger particles into the filler constituent, coarse aggregate is mixed with sand; the aggregate typically being composed of gravel or crushed rock.

An example of a filler constituent including large aggregate particles is a fine sand, as for example used for bricklaying, with 94% passing a 600 micron sieve when mixed with a gravel having up to 6 mm particle size in proportions of 40% fine sand to 60% gravel.

As indicated above when aggregate is used, the particle size preferably does not exceed about 10 mm, more preferably about 6 mm, so as to avoid segregation of the constituents in the dry mixture during, for example, storage, transportation and laying. Maximum aggregate sizes of up to 10 mm may be employed, for example, for aesthetic purposes whereby the aggregate may be exposed by light brushing of the surface to remove fine material after surface compaction but before the material has hardened.

It is envisaged that larger aggregate may be incorporated into the hard material. This is preferably achieved by laying the dry mixture and then subsequently embedding the larger aggregate into the mixture by compaction, preferably by rolling. In such a situation the introduction of larger aggregate does not interfere with the homogeneous nature of the dry mixture and does not constitute part of the filler constituent of the mixture.

The dry mixture of the present invention contains finely and evenly dispersed voids throughout the mixture which means that air will be entrained within the mixture and will therefore enhance the fluidity of the mixture and thereby enable sufficient fluidity to be achieved for spreading of the dry mixture during the laying step.

In a typical situation the laying step will involve initially pouring the mixture onto the substrate and then spreading it out. Whilst performing these actions the particles or grains in the mixture tend to roll relative to one another and after spreading and levelling the mixture will settle and to some extent self compaction will occur. Since the mixture is relatively fluid when being poured onto and spread across the substrate, cavities in the surface of the substrate will be intimately filled. Thus the applied covering of the mixture will be fully supported by the substrate.

It will be understood that cements vary and, consequently, the cementitious content of the material will also vary, dependent on the particular cement system employed. The cement constituent may be a hydraulic or a non hydraulic cement.

To illustrate the formulation with a hydraulic cement such as Ordinary Portland cement the cement content is preferably chosen to be between 20% and 50%, and is more preferably between 25% and 40%, of the total dry materials by weight.

If pozzolanic materials were employed to form part of the cement constituent the quantity of the ordinary Portland cement would also vary, the pozzolan replacing part of the cement but not all the pozzolan necessarily being effective at this; any unreactive material will simply form part of the filler.

If, with Portland type cements alone, the cement content was reduced below 20% this would result in the voids and surface area of filler being too large in relation to the cement hydrate and the $R_{vc}$ ratio would be too high. If this cement content was increased above 50% the voids would also be excessive and the $R_{sv}$ ratio would be too low. The dry material would not consolidate adequately before or after wetting and the moisture movement and shrinkage would generally be excessive.

It will be obvious to those skilled in the art that the use of hydraulic cement systems which combine chemically with larger quantities of water will allow for an initial larger volume of voids to be practical as these can, subsequently, be effectively sealed by the products of hydration. Typical of such cement systems are Calcium Sulpho—Aluminate types hydrating to the tri-sulphate mineral form of Ettringite.

Compared with conventional concrete the mix design for this application has

1. A far higher cement content 500 kgs to 900 kgs per cubic metre compared with 250 kgs to 400 kgs for conventional concrete.

2. An absence of larger aggregate, typically none above about 6 mm compared to over 50% up to 20 mm with conventional concrete.

If the mix design developed for this process were used conventionally, as a wet mix, the high fines and high cement content would result in serious self induced cracking problems caused by drying shrinkage which are avoided in this process.

EXAMPLE 1

An illustrative example of a dry blended mixture and its application is described below. The following constituents were blended together to form a dry blended mixture as follows:

| Constituent | % by Weight |
|---|---|
| Hydraulic Cement, O.P.C. B.S.12 | 28.5% |
| Coarse sand* | 71.5% |

*coarse sand used had particle sizes from minus 150 microns up to 3 mm and a dry sieve analysis (undertaken in accordance with B.S. 882, table 5) gave the following results

| Sieve size | 5.0 mm | 2.36 mm | 1.18 mm | 0.6 mm | 0.3 mm | 0.15 mm |
|---|---|---|---|---|---|---|
| % passing | 100 | 86 | 78 | 69 | 35 | 5 |

The above blended dry material was then laid over a compacted hardcore base to a nominal thickness of 40 mm. The material was floated to provide a flat, smooth, fine compact surface to which water was sparingly applied, using a standard garden watering can fitted with a spraying rose. The material was wetted to produce a uniformly, damp surface which was then compacted by using a small plastic roller measuring 200 mm by 30 mm diameter.

It was found that after wetting and light compacting by this roller, the surface could be walked upon without visible signs of indentation. After about 1 hour, further water was added to the surface. The total water applied in this way was approx. 35 litres and represented about 30% of the weight of the cement.

The area was external and, subsequently, additional water was applied as natural rainfall.

The area involved was approximately 2.4 metres and 2.4 metres square and after 7 days it was subjected to vehicle traffic by a private motor vehicle. No visible evidence of cracking or any other form of deterioration was evident and after wet weather, surface water is retained until it evaporates, there being no evidence of significant absorption.

EXAMPLE 2

A similar process to that described in example 1 was repeated using a mix consisting of hydraulic cement, fine sand (with 94% passing a 600 micron sieve) and 6 mm aggregate. The proportion of cement was 28.5% by weight and the combined proportion of fine sand and aggregate being 71.5% by weight. The proportion of fine sand to aggregate was 40:60.

The results achieved were basically identical to those obtained in example 1.

EXAMPLE 3

Dry mixtures used in examples 1 and 2 were laid in moulds to produce a pre-cast slab, 2 areas of each slab (labelled below as a, b) were subjected to the following tests:

Flexural bending, Compressive strength and Density
The results of these tests are summarised below:

|  | Sample 1 | | Sample 2 | |
|---|---|---|---|---|
|  | 1a | 1b | 2a | 2b |
| Density (Kg/Litre) | 2.13 | 2.22 | 2.13 | 2.22 |
| Measured Comp. Strength (MPa) | 38.00 | 35.70 | 31.90 | 36.30 |
| Flexural Strength (3 Point Bending Test)(MPa) | 6.74 | 6.22 | 7.80 | 7.97 |

Sample 1 was produced from a mixture of cement and fine sand with 6 mm aggregate as per example 2 and sample 2 was produced from a mixture of cement and a coarse sand, as per example 1.

Conventionally samples are cured under water at 20° C. for 28 days before testing, this is an ideal condition and gives greater strength.

To produce more realistic results the above samples were not subject to any special curing so that the results simulate actual conditions much more closely.

visual examination of the surfaces , including the cross-section at point of fracture, indicated a dense well compacted material with an absence of air bubbles or any visible voids, This is consistent with the density measurements which are particularly high for a high cement content material.

Bearing in mind the lack of curing the compressive strengths are very good.

The flexural bending strengths are exceptionally high and this would appear to be attributable to the absence of large aggregate and more importantly to the low shrinkage achieved with this system. Bearing in mind the lack of curing these strengths are even more impressive.

The high flexural strength is of particular importance as this is generally the weakness of cementitious materials and improvements in this characteristic are consequently very important. A high flexural strength is important in thin section materials and is an important advantage resulting from the use of the present process.

It will be appreciated that the Rvc ratio gives a measure of the amount of cement hydrate available to fill the voids in the mixture. Thus with a high Rvc value it can be expected that a greater volume of voids will be present in the hard material than with a low Rvc value. This is because with a higher Rvc ratio there is less cement hydrate available to fill the voids in the mixture than with a lower Rvc ratio. There is thus a relationship between the volume of voids in the material and the Rvc ratio.

Bearing in mind that a reduction in the volume of voids in the hard material is desirable, then the choice of a Rvc ratio can be influenced by the volume of voids which can be expected in the hard material. Generally it is desirable that the ratio of the total volume of voids in the compacted dry mixture to the volume of hydrate produced by the full hydration of the cement constituent (including all reactive materials) should not exceed about 1.5. This ratio may be achieved by using a relative high Rye ratio and then subsequently adding to the mixture during the wetting process a reactive constituent which is able to assist in filling of the voids.

Accordingly, it is within the scope of the present invention to incorporate reactive constituents within the water which will react- with other constituents in the mixture to increase the volume of voids which will be filled by the cement hydrate and thereby improve the performance of the hard material compared to that which would be expected when considering the Rvc value only. A suitable reactive constituent is sodium silicate. Accordingly, in such a system, it is possible to use higher Rvc values but in such circumstances it is not envisaged that the Rvc ratio would exceed about 3.0.

The process, as developed, can be used with all types of hydraulic cements and mixtures of these as well as with pozzolanic materials such as P.F.A. (Pulverised Fuel Ash as obtained from coal fired power stations).

In addition, the process can, with advantage, be used with various materials used to accelerate the setting and hardening of cements and with mixtures of cements designed for the same effect. The acceleration of hardening and set are more practical with the process of the present invention since problems which occur with wet mixed materials due to setting during mixing, transport and placing are entirely eliminated.

The accelerators can be added to the dry mixed material or can be introduced with the water. If introduced with the water this can be either in the initial or final water addition or partly in both. This means that the acceleration can be delayed until compaction is completed and then a flash set condition can be induced by further addition of accelerator and water.

The use of wetting agents either in the mixture or added to the water can also be advantageous in assisting with the penetration of the water into the mixture. In addition, a polymer and/or a colouring agent may also be added to the water.

Also, the process can be used with surfactants, lubricants, polymers, colouring agents, fibres etc. as are used with conventional concretes and mortars.

These materials may be intermixed into the dry ingredients or added to the gauging water or added separately as liquids or surface treatments. The finished surfaces can also be treated with hardening and sealing materials and surface treatments to enhance the appearance are practical.

The process enables a dry pre-blended hydraulic cement system to be employed without the need for premixing with water. The process enables such a material to be easily placed in thin sections and to be levelled and smoothed and to be easily compacted without special equipment.

The process allows a cementitious material to be produced in this way which is very hard and strong and durable. The process allows a high cement content to be used without excessive shrinkage which reduces the tendency to drying shrinkage cracking. The process produces a material with a higher flexural or tensile strength than conventional concretes or mortars which is a particularly important advance since this is, normally, the fundamental weakness with such material.

The process produces a new, easy to use cementitious system with great advantage compared to those previously available.

The hard material produced by the present invention can be used in applications where conventional concretes are used, eg. floors, roads, constructional components etc.

The mixture may be laid on a substrate such as a prepared floor foundation, processed and left in situ or may be laid in a mould to produce cast articles.

We claim:

1. A dry lay homogeneous cementitious mixture comprising a cement constitiuent and an aggregate constituent for producing a hard cementitious material, the relative proportions and grading of the constituents being such that
   (i) the bulk compacted volume of finer particles of both said constituents exceeds the volume of voids between compacted coarser particles of the aggregate constituent as determined in the absence of the finer particles such that the coarser particles are suspended in and spaced apart by the finer particles so as to avoid segregation of the mixture
   (ii) the ratio Rvc is 3 or less, and
   (iii) the ratio Rsv is 2 or more, wherein
   Rvc is the ratio of total volume of voids in the dry mixture when compacted to the absolute volume of the cement constituent, and
   Rsv is the ratio of total absolute volume of all constituents to total volume of voids in the dry mixture when compacted.

2. A cementitious mixture according to claim 1 wherein, the cement is a hydraulic cement.

3. A cementitious mixture according to claim 1 wherein, the Rvc ratio is substantially 2 is less.

4. A cementitious mixture according to claim 1, wherein the cement constituent forms between 20% to 50% by weight of the total weight of the dry mixture.

5. A cementitious mixture according to claim 4, wherein the cement constituent forms between 25 to 40% by weight of the total weight of the dry mixture.

6. A cementitious mixture according to claim 5, wherein the cement constituent forms between 25 to 33% by weight of the total weight of the dry mixture.

7. A cementitious mixture according to claim 1 wherein, the aggregate constituent comprises particles having grain sizes varying up to about 3 mm.

8. A cementitious mixture according to claim 7 wherein the aggregate constituent contains a majority volume of particles having sizes below about 1.00 mm.

9. A cementitious mixture according to claim 8 wherein the aggregate constituent contains at least about 40% by volume of particles having sizes below about 0.60 mm.

10. A cementitious mixture according to claim 9 wherein, the aggregate constituent comprises a sand including about 5% by volume of particle sizes below about 0.2 mm and about 70% by volume of particle sizes below about 0.6 mm.

11. A process for producing a hard material from a dry cementitious mixture comprising a cement constituent and an aggregate constituent for producing a hard cementitious material, the relative proportions and grading of the constituents being such that (i) the bulk compacted volume of finer particles of both said constituents exceeds the volume of voids between compared coarser particles of the aggregate constituent as determined in the absence of the finer particles such that the coarser particles are suspended in and spaced apart by the finer particles so as to avoid segregation of the mixture, (ii) the ratio Rvc is 3 or less, and (iii) the ratio Rsv is 2 is more, wherein Rvc is the ratio of total volume of voids in the dry mixture when compacted to the absolute volume of the cement constituent, and Rsv is the ratio of total absolute volume of all constituents to total volume of voids in the dry mixture when compacted, the process including the steps of laying the dry mixture onto a substrate, sparingly applying water to the surface of the mixture to dampen a surface layer of the mixture for setting the cement in said surface layer, and subsequently applying more water for setting and hardening the cement below the surface layer.

12. A process according to claim 11 wherein, after sparingly applying water to dampen the surface layer and prior to application of more water a compacting step is performed on the surface layer to smooth and compact at least the surface layer.

13. A process according to claim 12 wherein, the compacting step is performed by rolling the surface layer with a roller.

14. A process according to claim 11 wherein, the subsequent application of more water is performed after setting of the cement in the surface layer.

15. A process according to claim 11 wherein, the subsequent application of more water is performed prior to setting of the cement in the surface layer.

16. A process according to claim 11 wherein a constituent reactive with the cementitious mixture is included in the water initially sparingly applied or subsequently applied to the mixture, the reactive constituent serving to react with constituents in the mixture to cause filling of the voids.

17. A process according to claim 16, wherein the reactive constituent is sodium silicate.

18. A process according to claim 11 wherein, the laying step is performed in an outdoor environment, and the subsequent application of water is performed at least in part by a natural source of water from the environment or permeation of water from the substrate into the mixture.

19. A process according to claim 11 wherein, the laying step is performed so as to provide a relatively thin covering layer which, after setting and hardening of the cement, is left in situ.

20. A process according to claim 11 wherein, the substrate forms part of a mould and the laying step is performed to fill the mould so that after setting and hardening of the cement a cast body of said hard material is produced.

21. A dry lay homogeneous cementitious mixture comprising a cement constituent and an aggregate constituent for producing a hard cementitious material, the relative proportions and grading of the constituents being such that
  (i) the bulk compacted volume of finer particles of both said constituents exceeds the volume of voids between compacted coarser particles of the aggregate constituent as determined in the absence of the finer particles such that the coarser particles are suspended in and spaced apart by the finer particles so as to avoid segregation of the mixture;
  (ii) the ratio Rvc is 3 is less;
  (iii) the ratio Rsv is 2 or more, wherein
  Rvc is the ratio of total volume of voids in the dry mixture when compacted to the absolute volume of the cement constituent, and
  Rsv is the ratio absolute volume of all constituents to total volume of voids in the dry mixture when compacted; and
  (iv) the aggregate consists of gravel, sand, or crushed rock, having a particle size of less than about 10 mm.

22. A cementitious mixture according to claim 21 wherein, the maximum particle size of the aggregate is about 6 mm.

* * * * *